United States Patent [19]

Newcomb et al.

[11] 4,284,399
[45] Aug. 18, 1981

[54] CONTACT LENS MOLD

[75] Inventors: Paul D. Newcomb, Franklin; Paul A. Davignon, Uxbridge; Harold M. Miller, Whitinsville, all of Mass.

[73] Assignee: American Optical Corporation, Southbridge, Mass.

[21] Appl. No.: 161,832

[22] Filed: Jun. 23, 1980

[51] Int. Cl.³ .................... B29C 5/00; B29D 11/00
[52] U.S. Cl. .................... 425/410; 425/412; 425/808; 249/117; 249/160; 264/1.1
[58] Field of Search ............ 425/410, 808; 249/160

[56] References Cited

U.S. PATENT DOCUMENTS

| 3,841,598 | 10/1974 | Grucza | 425/808 |
| 3,902,693 | 9/1975 | Crandon et al. | 425/808 |
| 4,113,224 | 9/1978 | Clark et al. | 425/808 |
| 4,121,896 | 10/1978 | Sheperd | 425/808 |
| 4,190,621 | 2/1980 | Greakes | 425/808 |
| 4,209,289 | 6/1980 | Newcomb et al. | 425/410 |

Primary Examiner—J. Howard Flint, Jr.
Attorney, Agent, or Firm—Jeremiah J. Duggan; Alan H. Spencer

[57] ABSTRACT

A two piece contact lens mold having a pair of blunt, continuous mating surfaces extending around the periphery of the mold cavity is disclosed. Location of the mold parting line tangent to the lens edge substantially eliminates registration problems when a relief groove is provided at the edge of the female member. Parameters for mold materials and important dimensions are also disclosed. The mold can produce finished contact lenses which do not require further machining.

2 Claims, 2 Drawing Figures

CONTACT LENS MOLD

BACKGROUND OF THE INVENTION

Prior Art

U.S. Pat. No. 4,121,896 issued Oct. 24, 1978 to Shepherd. The mold disclosed has a flexible lip that permits the mold halves to move closer together during curing to compensate for lens material shrinkage.

U.S. Pat. No. 4,113,224 issued Sept. 12, 1978 to Clark. This patent discloses a plurality of passages connecting the mold cavity with the riser. The structure compensates for shrinkage by keeping the material in the riser fluid longer than that in the mold cavity. Machining is essential to obtaining a finished lens.

Copending application Ser. No. 039,100 filed May 14, 1979 and now U.S. Pat. No. 4,209,289 discloses a mold having continuous mating surfaces with the parting line at the junction of the lens edge and anterior lens surface.

Referring to FIG. 1, the female mold half is formed by a frustronconical support 1 having flange 2 extending from the large end. Concave molding surface 3 has continuous flat mating surface 4 extending radially outwardly from periphery 5 of surface 3. Outwardly tapering wall 6 extends from outer edge 7 of mating surface 4 to the narrow end 8 of frustroconical support 1.

The male mold half is formed by frustroconical side 9 with flange 10 extending outwardly from the large end and convex molding surface 11 extending across the small end of side 9. Recess 12 forms a groove extending around the periphery of surface 11 to define the edge shape of a lens cast in cavity 13. Continuous flat mating surface 14 extends radially outwardly from recess 12 to side 9.

The radii of surfaces 3 and 11 are selected to provide a chosen power and base curve in the lens product well known to those skilled in the contact lens art. The surfaces have a common axis 15 when the mold halves are assembled. Registration of the mold halves is obtained by an interference fit between edge 7, at the juncture of mating surface 4 with wall 6, and edge 16, at the juncture of mating surface 15 and side 9. The amount of interference must be such that the shape of neither recess 12 nor surface 11 is distorted when mating surface 4 is in contact with mating surface 14. Riser 17 is formed by difference in taper angles for side 9 and wall 6 and accommodates an excess of lens material necessary to ensure completely filling cavity 13.

DESCRIPTION OF THE INVENTION AND DRAWINGS

Figure 1:
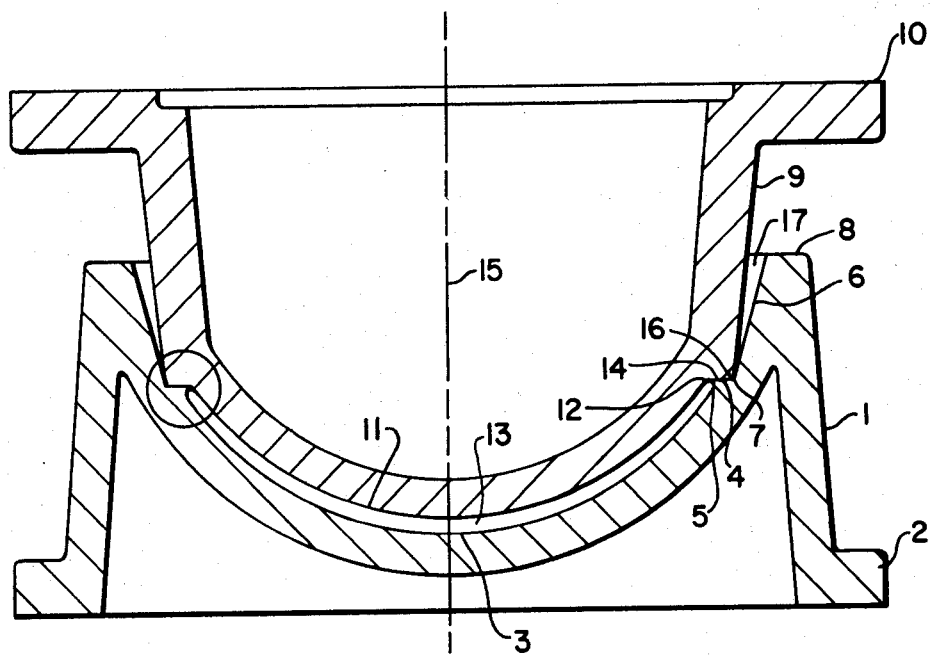
FIG. 1 is a side view of a prior art assembled mold in cross-section.
Figure 2:
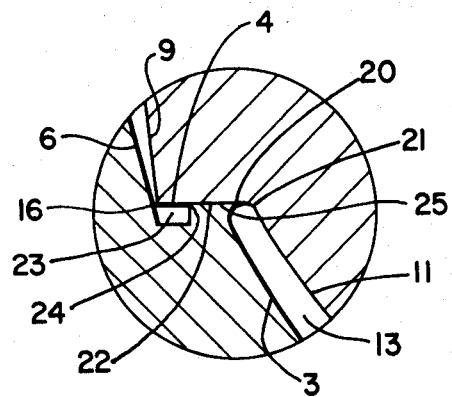
FIG. 2 is an enlargement of the mold junction area of the present invention.

Referring to FIG. 2, the male mold member has a continuous mating surface 4 extending inwardly from side 9 to a line tangent to the edge 20 of the lens in cavity 13. A first portion 21 of the lens edge 3 is formed by a concave junction surface extending from mating surface 4 to convex molding surface 11. The female mold member has a continuous mating surface 22 extending outwardly from lens edge 21 toward outwardly tapering wall 6. Annular groove 23 extends around the periphery of outer edge 24 of mating surface 22 and provides clearance for any protrusions that may be found in edge 16 of the male mold member. A second portion 25 of the lens edge is formed by a concave junction surface extending from mating surface 22 to concave molding surface 3. Since mold parting line 20 is tangent to the lens edge, misregistration of the mold halves where edge 16 contacts wall 6 does not result in a dibilitating defect in the lens edge.

Since soft contact lens materials generally shrink 7% to over 20% by volume during curing, it is important that the mold be carefully designed to avoid prerelease or distortion during curing. Critical parameters, which must be considered in addition to the mold material being inert to the contact lens precursor, include softening temperature of the mold material, curing temperature of the contact lens material, mold thickness in the areas of the cavity, and flexibility of the mold material. In addition, size of the lens may require consideration and adjustment of the mold dimensions.

Polypropylene is a preferred mold material for lenses that typically are 0.3 to 0.7 inch in diameter, having a thickness in the range of 0.003 to 0.04 inch, and that shrink 10% to 20% by volume. A mating surface dimension in the order of 0.0001 to 0.020 inch has been found suitable for lenses having the above parameters and a dimension of about 0.002 inch is preferred. This dimension is sufficient for the mating surfaces to accurately control lens thickness. An annular groove having 0.001 inch by 0.001 inch has been found to provide sufficient relief, avoid flash at the mold joint and provide adequate registration when a weight of about two to three pounds per mold is placed on top of the male mold member. The mold thickness in the vicinity of the cavity, i.e., behind the concave and convex molding surfaces, can range from 0.015 to 0.045 with thickness of about 0.035 being preferred. Examples of suitable contact lens materials include those disclosed in U.S. Pat. Nos. 3,700,761 and 4,036,814.

What is claimed is:

1. A disposable contact lens mold for casting a finished, water swellable, soft contact lens, the lens having a chosen diameter, a posterior surface, a finished edge and an anterior surface which comprises, a hollow, frustroconical male member having a convex molding surface at the narrow end, said convex molding surface having a first chosen radius for shaping the posterior surface, a first longitudinal axis extending through said member, a solid, continuous, ring-shaped, rigid mold mating portion extending from the narrow end of said male member radially inwardly toward said convex molding surface, said mating portion having first and second edges defining a first mating surface, and a first concave junction surface extending from said convex molding surface to said first mating surface at a line of tangentcy, said first junction surface having a second chosen radius for shaping a portion of the finished edge, a hollow, inverted frustroconical female member having a cavity at the narrow end for receiving said male member, said cavity having a centrally located concave molding surface, said concave molding surface having a third chosen radius for shaping the anterior surface of said lens, a second longitudinal axis extending through said female member, a second concave junction surface extending from the periphery of said concave molding surface, said second concave junction surface having a fourth chosen radius, a second mating surface extending radially outwardly from a tangent to said second junction surface, said second mating surface having an inner edge and an outer edge, an annular groove in said female mold member connected to said outer edge, and an outwardly tapering wall extending from said annular groove to the narrow end of said female member, said first edge of said male member and said inner edge of said female member having an identical diameter, said second edge having a diameter chosen to provide an interference fit with said outwardly tapering wall when said male and female member are united thereby providing coincidence of said first and second longitudinal axes and a parting line tangent to said finished edge of the lens.

2. The mold of claim 1 wherein said second and fourth radii are identical.

* * * * *